United States Patent [19]

MacLeod

[11] Patent Number: 4,630,243
[45] Date of Patent: Dec. 16, 1986

[54] APPARATUS AND METHOD FOR LOGGING WELLS WHILE DRILLING

[75] Inventor: Norman C. MacLeod, Sunnyvale, Calif.

[73] Assignee: MacLeod Laboratories, Inc., San Jose, Calif.

[21] Appl. No.: 477,262

[22] Filed: Mar. 21, 1983

[51] Int. Cl.[4] .......................... G01V 1/40; G01V 3/18
[52] U.S. Cl. ..................... 367/82; 324/323; 324/369; 175/42; 340/856
[58] Field of Search ................. 175/42; 324/323, 342, 324/356, 369; 252/8.513; 367/81, 82; 73/151; 340/853, 854, 856, 859

[56] References Cited

U.S. PATENT DOCUMENTS

| | | | |
|---|---|---|---|
| 2,153,802 | 4/1939 | Jakosky | 324/356 |
| 2,181,601 | 11/1939 | Jakosky | 324/369 |
| 2,411,696 | 11/1946 | Silverman et al. | 324/369 |
| 2,755,067 | 7/1956 | Williston | 324/356 |
| 3,967,201 | 6/1976 | Rorden | 340/854 |
| 4,087,781 | 5/1978 | Grossi et al. | 340/854 |

*Primary Examiner*—Salvatore Cangialosi
*Assistant Examiner*—Ian J. Lobo
*Attorney, Agent, or Firm*—Hamrick, Hoffman, Guillot & Kazubowski

[57] ABSTRACT

Measurement while drilling apparatus for detecting and communicating information relative to downhole parameters and/or characteristics of the earth strata via an electrically conductive drill string composed of a plurality of lengths of metallic pipe connected end-to-end in series and through which a drilling fluid is caused to flow and then return to the surface through the well cavity formed between the exterior wall of the drill string and the interior wall of the well comprising a DC voltage supply for establishing a unidirectional biasing current passing through the electrically conductive drill string, drill bit and surrounding earth strata, a colloidal suspension of ferro-magnetic particles coated with a non-conductive coating forming a part of the drilling fluid and carried by the drilling fluid through the well cavity wherein the ferromagnetic particles are caused by the magnetic field to migrate toward the outer surface of the drill string and to form an insulative coating thereon, a downhole module for detecting downhole parameters and/or characteristics of the surrounding earth strata and for developing a communication current flow commensurate therewith in the conductive drill string, and a communication electronics coupled to the drill string at a point remote from the module for receiving the communicative current flow.

10 Claims, 16 Drawing Figures

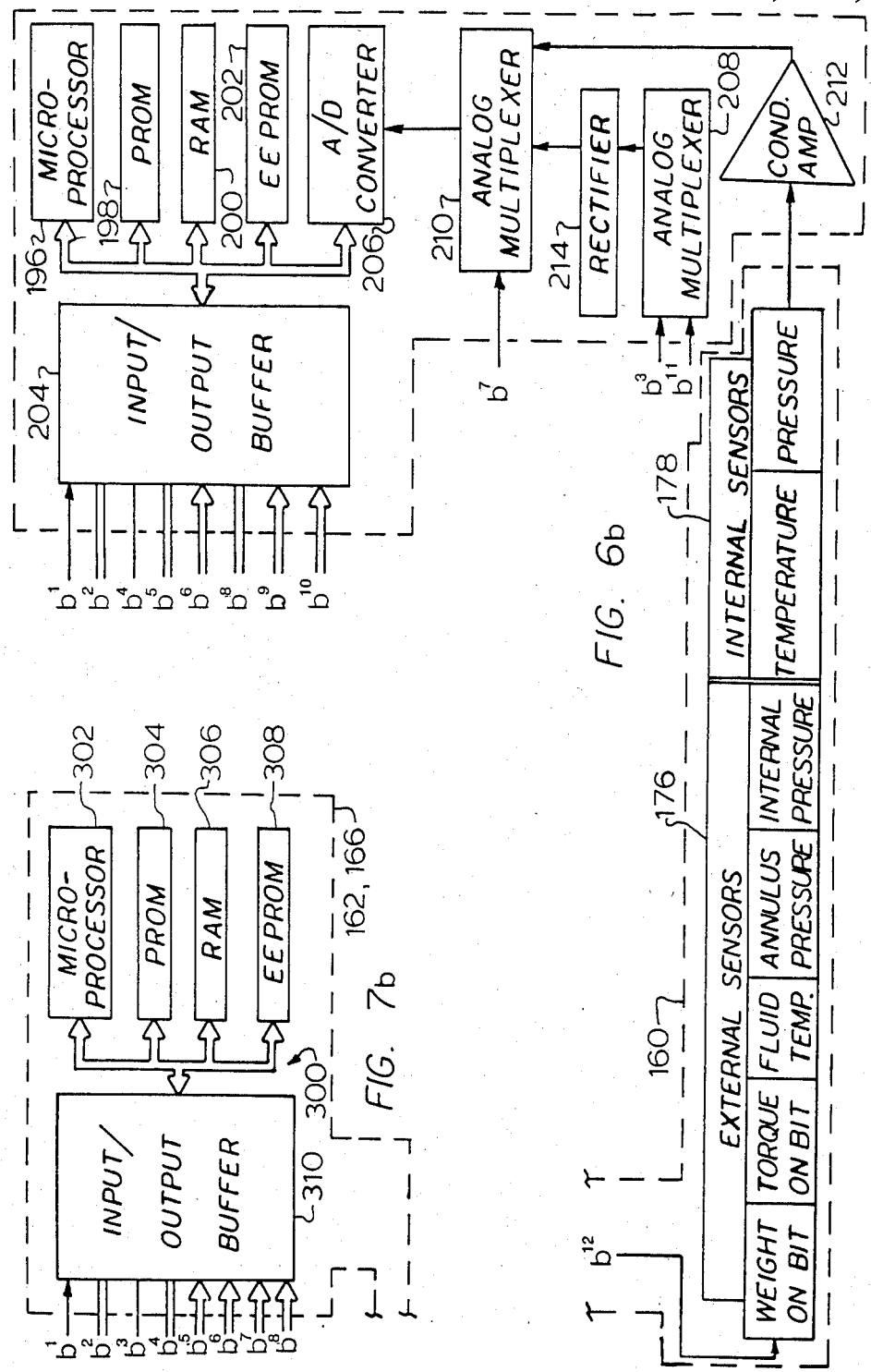

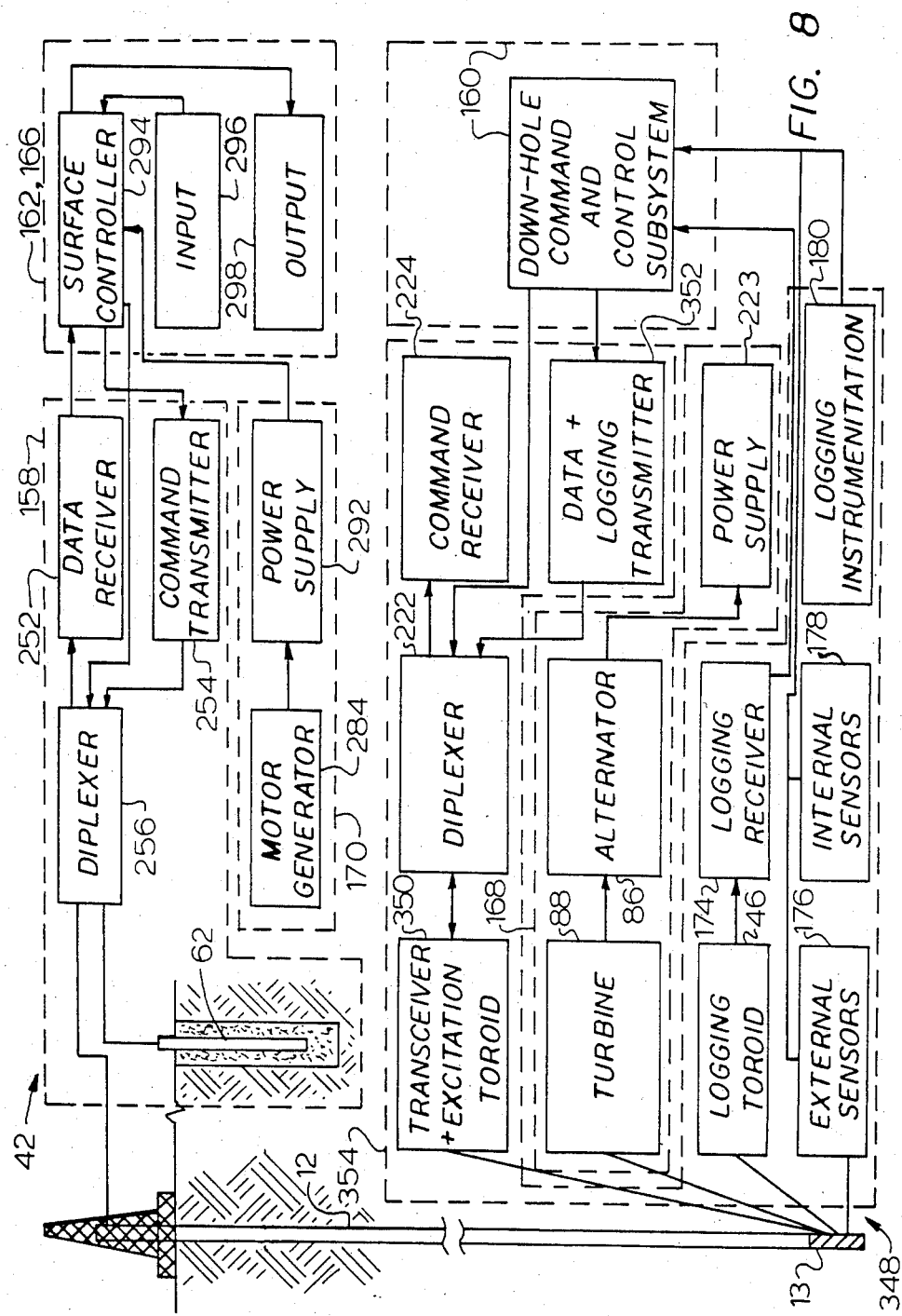

APPARATUS AND METHOD FOR LOGGING WELLS WHILE DRILLING

BACKGROUND OF THE INVENTION

1. Field of the Invention

This invention relates generally to subterranean instrumentation and telemetry systems and relates more specifically to apparatus for logging wells by remote sensing and real-time surface recording of well drilling parameters.

2. Description of the Prior Art

During the drilling of a well, certain parameters concerning the drilling operation and the earth strata being drilled through are of interest. Knowledge of the materials comprising the earth strata is valuable to the drilling rig operators. This knowledge enables the weight, speed, and torque of the drill bit to be adjusted to obtain optimum drilling performance. Knowledge of the strata also permits a suitable selection of a drilling fluid, which is pumped down the hollow drill pipe to convey the drill tailings to the surface, and to keep the hydrostatic pressures in balance.

It is desireable to identify the strata beneath the drill bit, prior to its contamination by the drilling fluid, as well as the strata that has been drilled through. Information concerning the drill bit, such as torque and weight on bit, is of interest and can be utilized to optimize drilling performance. Knowledge of certain drilling fluid characteristics, such as temperature and pressure, is useful as well.

All of this information is most useful and most indicative of the drilling environment when it is obtained while in the process of drilling. Parameters concerning the drilling operation should be measured in the dynamic drilling environment and relayed in real-time to the surface to permit the drilling rig operators to optimize drilling performance. Identification of the earth strata while drilling is also desireable. One common method of strata identification requires the drilling to be halted and the drill pipe and drill bit to be completely removed from the bore hold to allow a wire-line sensor to be lowered into the well for strata identification. By this time, the strata has been contaminated by the drilling fluid which alters its resistivity and makes it more difficult to identify and evaluate. Then, when the measurements are completed, the sensor is removed from the bore hole and the drill pipe and drill bit are replaced. This very time consuming and expensive procedure would be unnecessary if the strata could be identified and evaluated while drilling.

Several problems are encountered in logging wells, in both the measurement of the parameters of interest and in the communication of these measurements to the top of the well. The down-hole environment itself is quite harsh with elevated temperatures and pressures. Drill bit vibrations may be quite high. The drilling fluid flowing through the drill pipe bit may be highly abrasive. One design consideration is that the down-hole measurement unit must be durable enough to withstand this hostile environment for long periods of time. Another design consideration is that electric power must be provided to the down-hole measurement unit for powering the measurement sensors and circuits. Additionally, data gathered by the down-hole measurement unit must be communicated, in some manner, to the surface to provide real-time measurement while drilling (MWD). The use of cables to provide electric power to the down-hole measurement unit and to provide data communication between the down-hole measurement unit and a surface recording unit are impractical with standard rotary drilling procedures. Electromagnetic signals, propagated through the earth, may be used to communicate between the down-hole measurement unit and the surface recording unit, but signal attenuation and noise problems limit the usefulness of this approach.

A substantial amount of prior art exists concerning well logging apparatus. However, only the most appropriate art will be cited herein. Toroidal transformers, which are toroidal cores of magnetic material wound with wire, are known for use in well logging apparatus. Still discloses in U.S. Pat. Nos. 3,793,632 and 4,302,757 methods of using toroids to transmit data along a drill string. Silverman, in U.S. Pat. No. 2,354,887, discloses the use of a toroidal transformer for sensing a surface generated current in a drill pipe that is proportional to the conductivity of the earth strata between the drill bit and the surface. Arps in U.S. Pat. No. 3,305,771 and Martin in U.S. Pat. No. 3,079,549, disclose the use of toroidal transformers to sense current flow in drill pipes for logging wells. See also "Theory of Transmission of Electromagnetic Waves Along a Drill Rod in Conducting Rock" by James R. Wait and David A. Hill; trans. on Geoscience Electronics, pp. 21-24, Vol. GE-17, No. 2, April, 1979.

The use of toroidal transformers for inducing a modulated alternating current indicative of logging data in a drill pipe at a subsurface location for transmission to the surface is disclosed by Silverman in U.S. Pat. Nos. 2,354,887 and 2,411,696, by Scherbatskoy in U.S. Pat. No. 4,057,781, and by Zuvela in U.S. Pat. No. 4,181,014. Scherbatskoy, in U.S. Pat. No. 4,057,781, also discloses a toroidal transformer employed as a device for sensing modulated alternating current in a drill pipe at the surface of a well as part of a circuit for receiving transmitted logging data. Silverman, in U.S. Pat. No. 2,411,696, discloses a similarly functioning toroidal transformer that is located below the surface for reduced noise sensitivity. However, none of the above cited patents disclose the use of a toroidal transformer located in close proximity to a drill bit for inducing a current through the drill bit in order to measure the conductivity of the surrounding earth strata.

A substantial problem associated with the use of a drill pipe as a communication medium is the signal loss which occurs along the length of the drill pipe due to conductive contact with either the earth strata surrounding the borehole or the drilling fluid surrounding the pipe. Heretofore, others have attempted to overcome this problem in various manners. For example, in U.S. Pat. No. 2,153,802 Jakosky discloses the use of an insulative drilling fluid and insulative spacers attached to the drill pipe to prevent the drill pipe from contacting the borehole, and Williston in U.S. Pat. No. 2,755,067 discloses the use of an insulative coating which is sprayed upon the surface of the drill pipe. However, neither of these techniques has been found to be effective in substantially reducing transmission losses along the drill pipe in deep hole applications.

A down-hole electrical generator powered by fluid flow is of interest in the present invention. One such generator is disclosed by Godbey in U.S. Pat. No. 3,305,825.

Alternative electrical and electromagnetic means for transmitting logging data from an area near a drill bit to the surface of a well are known in the art of well logging. See, for example, U.S. Pat. Nos. 2,181,601 (Jakosky), 3,967,201 (Borden), and 4,087,781 (Grossi) for various alternatives.

SUMMARY OF THE PRESENT INVENTION

A primary object of this invention is to provide improved well logging apparatus for real-time logging of well drilling and formation information.

Another object of this invention is to provide well logging apparatus capable of providing information indicative of underlying strata, that is to say strata situated beneath a drill bit, at a time prior to intrusion by drilling fluid.

An additional object of this invention is to provide well logging apparatus that, during the drilling operation, is capable of imparting alternating electrical currents of a range of frequencies into the surrounding strata and measuring parameters relating to the conductivity and dielectric constant of the strata at various distances from the drill bit.

A further object of this invention is to provide improved well logging apparatus that, during the drilling operation, is capable of two way communication along the drill pipe between a down-hole measurement unit and a surface recording and control unit.

Still another object of this invention is to provide well logging apparatus having variable frequency communication means between a down-hole measurement unit and a surface recording and control unit for the optimization of data transfer therebetween.

Still another object of this invention is to provide well logging apparatus with a communication link that is capable of selective transmission of real-time logging data between a down-hole measurement unit and a surface recording and control unit with the selection based on the value of the data and the available bandwidth of the communication link.

A still further object of this invention is to provide well logging apparatus with passive current couplers and conductors for the reduction of signal attenuation of logging data and control signals during transmission along a conductive drill pipe.

Another object of this invention is to provide well logging apparatus with active signal repeaters dispersed along the drill pipe to reduce the attenuation of signals transmitted therethrough.

Still another object of this invention is to provide a dynamic, self healing method of insulating a drill pipe from the surrounding strata during the drilling operation so as to accomplish improved signal transmission along the drill string.

These and other objects, which will hereinafter become apparent, are accomplished in accordance with the illustrated embodiments of this invention by providing a measurement while drilling (MWD) apparatus comprising a down-hole measurement unit and a surface recording and control unit. The down-hole measurement unit is contained in a drill collar at the end of a drill pipe just above the drill bit and includes the following: a data acquisition subsystem, and a power subsystem.

Included in the data acquisition subsystem are two toroidal transformers, coaxial to the drill collar and in the surrounding strata. The second toroidal transformer is located just above the drill bit and senses the portion of this induced current that passes through the drill collar and enters the strata through the drill bit. Data concerning the conductivity and dielectric constant of the surrounding strata can be computed from the phase shift and amplitude attenuation between the induced and the sensed currents. Some of the induced current enters the strata through the drill bit and passes through the strata immediately below the drill bit, thereby providing an indication of that strata. The frequency of the currents induced by the first toroidal transformer may be varied to examine the strata at different distances from the drill collar. High frequency signals are more highly attenuated by the strata then are low frequency signals, thus the penetration depth of the induced signals is inversely related to frequency. The data acquisition subsystem includes other sensors for measuring parameters such as weight and torque on the drill bit, pressures and temperatures and also includes loggers for performing acoustic, resistivity radiographic, and directional logging.

Logging data thus acquired is communicated to the surface recording and control unit by the communication subsystem. A data transmitter modulates a carrier wave according to the data and drives the windings of a third toroidal transformer which in turn induces a current in the drill pipe that corresponds to the modulated wave. This current travels up the conductive drill pipe and is sensed at the surface by the surface recording and control unit. The down-hole communication subsystem also includes a receiver that is also coupled to the third toroidal transformer for receiving command signals from the surface unit.

The command and control subsystem of the down-hole measurement unit is responsive to the command signals received from the surface unit. These command signals direct the command and control subsystem to select the excitation frequency of the first toroidal transformer to obtain logging data for the surrounding strata at different distances from the drill bit. The command signals also select the data transmission frequency. The data transmission frequency is generally decreased to compensate for the additional signal attenuation caused by (1) increased drilling depth (space loss) or (2) decreases in the resistivity of the earth strata being penetrated.

However, if the formation resistivity increases significantly at the drill bit, a different drill string excitation mode must be utilized in order to achieve optimum transmission up the drill string. In other words, if the earth in the vicinity of the lower part of the drill string below the transmitting toroid has such a large resistance that it no longer is effective as a ground plane (return circuit) it then becomes necessary to treat the drill string as a vertical dipole, immersed in a conductive media.

The best transfer of energy from the toroid to the drill string can be effected by finding the electrical resonance of the drill string in combination with the conducting media. The resonance frequency can be determined at the down-hole module by sweeping the frequency applied to the transmitting toroid and determining the frequency at which maximum input current is drawn thereby. This frequency is then the optimum or tuned frequency. Alternatively, the optimum frequency can be selected at the surface unit by commanding the down-hole module to sweep the transmission frequency while monitoring the received signal level to detect the maximum signal amplitude. The down-hole module is then commanded to operate at this frequency. A discussion of technical theory relating to the above techniques can be found in an article by K. M. Lee and G. S. Smith, entitled "Measured properties of bare and insulated antennas in sand," IEE Trans. Antennas and Propagat., Vol. AP-23, pp. 664-670, September, 1975. At the lower frequencies, less data can be transmitted per unit time, so additional command signals direct the down-hole command and control subsystem to selectively transmit only the most critical data.

Power for the circuitry of the down-hole measurement unit is provided by the power subsystem. The flow of drilling fluid down the hollow drill pipe rotates a turbine which in turn drives an alternator. The electrical output of the alternator is conditioned by a power supply and then is distributed to the various subsystems in the down-hole measurement unit. Batteries provide back-up power for a limited time when the flow of drilling fluid is halted.

In a similar fashion, the surface recording and control unit is coupled to the drill pipe and includes the following: a communications subsystem, a data acquisition subsystem, and command and control subsystem, and a power subsystem. The communications subsystem has a data receiver for receiving logging data from the down-hole measurement unit and a command transmitter for transmitting command signals to the down-hole unit. A surface electrode is buried in the ground to provide a return path for the transmission signals.

The surface data acquisition subsystem consists of a microprocessor, interface circuitry, displays, and recorders. Functionally, it takes the logging data received by the communications subsystem, processes it, and outputs the corresponding information to various displays and recorders for communication to the operator.

The surface command and control subsystem controls the sequence of operations and makes decisions for the down-hole measurement unit as determined by internal programming or by operator initiated commands. This subsystem determines the command signals that direct the down-hole unit to vary its logging and data transmission frequencies, as well as content of the transmitted data.

Power for the surface recording and control unit is independent of the drilling rig power and is provided by a motor generator set with a battery backup.

An alternative embodiment of the present invention utilizes two toroidal transformers in the down-hole measurement unit. The previously described first toroidal transformer is eliminated, while the second toroidal transformer is retained. The previously described third toroidal transformer is additionally utilized for the purpose of inducing currents in the surrounding strata for logging. This toroidal transformer performs its three functions on a time-sharing basis: excitation transmission (for logging), data transmission, and command reception.

In another alternative embodiment the exictation signals for logging originate at the surface instead of down-hole.

Two additional alternative embodiments seek to reduce the attenuation of signals carried by the drill pipe. One embodiment utilizes passive couplers that inductively couple to the drill pipe and convey the signals in insulated wires to reduce transmission losses. Another embodiment used active relays to receive, boost, and re-transmit the signals.

In still another alternative embodiment of the present invention, an insulative ferro-magnetic fluid is added to the drilling fluid during the drilling operation. An additional electrical current is also impressed upon the drill pipe to establish a magnetic field around the pipe which attracts the insulative ferro-magnetic fluid to the pipe's surface and thereby forms an insulative coating thereon. Since the drill pipe is continuously bathed in the drilling fluid, even though the coating might be removed by rubbing or abrasive contact, it will be immediately replentished and "healed".

An advantage of the present invention is that it provides the ability to characterize, while drilling, both adjacent and underlying strata at a range of distances from the drill bit.

Another advantage of the present invention is that it permits the variation of the frequency of data transmission to compensate for varying degrees of transmission signal attenuation.

A further advantage of the present invention is that it provides two way communication between the down-hole measurement unit and the surface recording and control unit to allow interactive data logging.

Other objects and advantages of the present invention will be apparent to those skilled in the art of well logging apparatus after having read the following detailed description of the preferred and alternative embodiments which are illustrated in the several figures of the attached drawing.

DESCRIPTION OF THE DRAWINGS

FIG. 6A and FIG. 6B present a functional diagram of the down-hole measurement unit of FIG. 2.

FIG. 7A and FIG. 7B present a functional diagram of the surface recording and control unit utilized in the measurement while drilling system of FIG. 1.

FIG. 8 is a functional diagram of an alternative embodiment of a measurement while drilling system employing two toroidal transformers in a down-hole measurement unit for logging data and communicating with a surface recording and control unit.

DESCRIPTION OF THE PREFERRED EMBODIMENT

Figure 1:
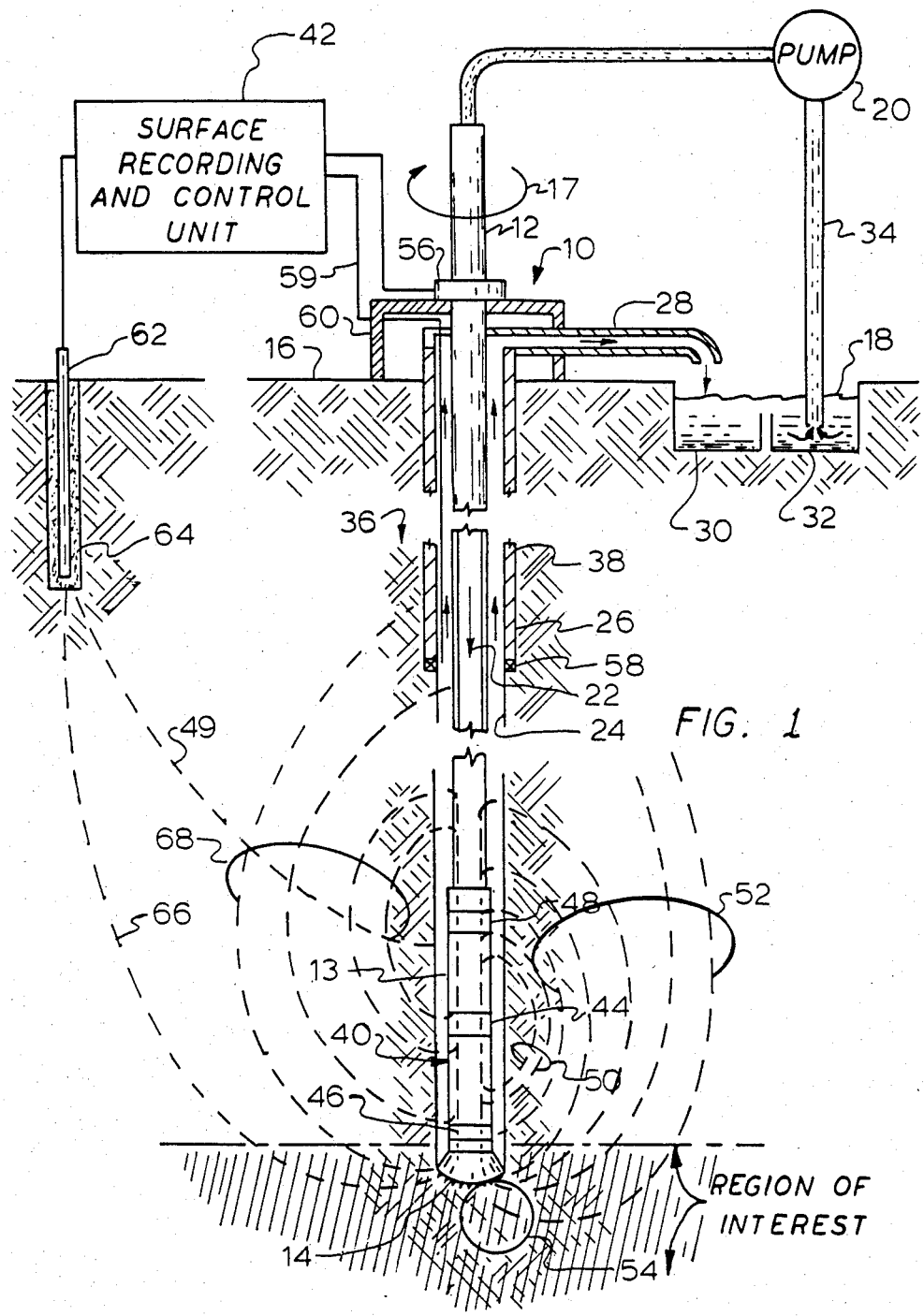
FIG. 1 is a schematic and sectional view of a well drilling rig employing a measurement while drilling (MWD) system for use in logging data relating to well drilling.

Referring to FIG. 1, there is shown a cross-sectional view of a well 10, drilled by conventional rotary drilling apparatus, that employs a preferred embodiment of the present invention for logging measurement while drilling (MWD). Specifically, the conventional rotary drilling apparatus includes a drill pipe 12 (also known as a drill string) composed of a number of threadedly interconnected tubular pipe sections carrying at their lower end a modified drill collar 13 terminated by a drill bit 14 or drilling motor. At the surface 16, the drill pipe 12 is supported and rotated in direction 17 by standard apparatus (not shown) thereby rotating the drill bit 14 to advance the depth of the well 10.

A recirculating flow of drilling fluid 18 is utilized to lubricate the drill bit 14 and to convey drill tailings and debris to the surface 16. Accordingly, the drilling fluid 18 is pumped down the well 10 by a pump 20 and flows through the interior of the drill pipe 12, as indicated by arrow 22, then through the drill bit 14 and up the annular cavity between the drill pipe 12 and the bore hole 24, as indicated by arrow 26.

Upon reaching the surface 16, the drilling fluid 18 is ducted by a pipe 28 to a settling pond 30 where the drill tailings precipitate from the drilling fluid. A portion of the drilling fluid 18 in the settling pond 30 spills over into a sump 32 where it is drawn into the pump 20 through an intake pipe 34 for recirculation through the well 10. Different types of drilling fluids are utilized depending upon the types of earth strata 36 encountered. Also forming part of the conventional rotary drilling apparatus is a casing pipe 38 that is inserted into the bore hole 24 from the surface 16 to prevent water and surrounding strata from entering the well 10.

Well logging while drilling is accomplished in a measurement while drilling (MWD) apparatus according to the present invention using a down-hole measurement unit or module 40 that is located in and forms a part of the drill collar 13 at the bottom of the drill string 12 just above the drill bit 14, and a surface recording and control unit 42 that is coupled to the top of the drill pipe at the surface 16. Basically, the module 40 measures various parameters of the earth strata near the drill bit 14, along with various parameters dealing with the drilling operation, and conveys these measurements to the surface recording and control unit 42 via the drill collar 13 and the drill string 12. In order to function properly, the drill collar 13 and the drill string 12 must provide an electrically conductive path from the module 40 to the surface unit 42. Special care must be taken to ensure electrical continuity through each of the joints between sections of the drill string 12.

To assist in its measurement and communication tasks, the module 40 utilizes three toroidal transformers 44, 46, and 48 that are toroids consisting of magnetic material wound with insulated wire conductors. Each of the three toroidal transformers 44, 46 and 48 is positioned at spaced apart vertical locations coaxial with and encircling the drill collar 13 so that any current or signal flowing in the drill collar flows through the axial openings, or holes, of the toroids. The toroidal transformers can operate as either transmitters or receivers by inductively coupling current flow in the drill collar 13 into the coil conductors and vise versa. As a transmitter, a toroidal transformer induces a current flow in the encircled drill collar 13 in response to current flowing in its coil winding. Conversely, when acting as a receiver, a current flow is induced in the coil winding by the flow of current in the encircled drill collar 13.

The first toroidal transformer 44, or excitation toroid, acts as a transmitter to induce an alternating flow of current in the encircled drill collar 13. This induced current flows along the drill collar 13, the drill pipe string above, and the drill bit 14 below, and leaks into the surrounding strata 36 through contact at the drill bit below or through the drilling fluid 18 above. To form a complete circuit, current flows through the strata 36 near the well 10 as indicated by dashed lines 50 and 52.

The second toroidal transformer 46, or logging toroid, is located just above the drill bit 14 and acts to sense the current flowing in the encircled drill collar 13 at that point. A portion of the induced current flowing in the drill collar 13 leaks into the strata 36 above the logging toroid 46 and flows therethrough as indicated by dashed lines 50. Meanwhile, the remainder of the induced current flows in the drill collar 13 through the axial opening of the logging toroid 46 and into the strata 36 along outer flow paths indicated by the lines 52. The portion of the induced current that leaks to the strata 36 below the logging toroid 46 versus the portion that leaks into the strata above the logging toroid is a function of the conductivity of the surrounding strata.

By using the logging toroid 46 as a receiver to sense the current flowing through the lower end of the drill collar 13, ie., through drill bit 14, and by knowing the current flow induced in the drill collar by the excitation toroid 44, the module 40 can characterize the surrounding strata 36. Additionally, by measuring the phase shift between the signal induced by the excitation toroid 44 and the signal sensed by the logging toroid 46, the dielectric constant of the surrounding strata 36 may be determined.

A large percentage of the current measured by the logging toroid 46 passes through the drill bit 14 and into the strata 54 below it. Placement of the logging toroid 46 as close to the drill bit 14 as is practical maximizes this percentage. Measuring the induced current that leaks into the strata 54 through the drill bit 14 thus characterizes the strata ahead of the drill bit.

Strata at a range of distances beneath the down-hole measurement unit 40 can be characterized by varying the frequency of the current induced by the excitation toroid 44. High frequency signals are attenuated more by the strata than are low frequency signals, thus, the penetration depth of the signals and the corresponding characterization depth is inversely related to frequency.

Data indicative of the surrounding strata as well as other data acquired by the module 40 must be communicated to the surface unit 42. To accomplish this, the third toroidal transformer 48, or transceiver toroid, is utilized as a transmitter to convey data to the surface 16 by inducing modulated alternating currents in the drill collar 13 and the drill string 12 for reception at the surface 16.

Command signals originating in the surface unit 42 must also be communicated to the down-hole module 40. Again, the drill pipe 12 is utilized as a conductor of a modulated alternating current for purposes of communication. In this case the toroid 48 acts to receive the command signals which, after passing through toroid 48, return through the strata as indicated by the dashed line 49.

The surface unit 42 may be coupled to the drill string 12 in several different ways. In one method, a coupling 56 is provided for direct electrical connection between the drill string 12 and the surface unit 42. The function of the coupling 56 may be accomplished by any conductor in good electrical contact with the top of the drill string 12 and may be, for example, associated with a blow out preventer 60. In another method, a fourth toroidal transformer 58 is mounted to the bottom end of the casing pipe 38 prior to installation in the well 10 and is coupled to the surface unit 42 with a shielded cable 59. This toroid serves to inductively receive the signals transmitted up the drill string from the down-hole module 40 and to inductively transmit command signals from the surface unit 42 back into the drill string 12. The location indicated is particularly advantageous in eliminating atmospheric and surface generated noise thereby improving the signal-to-noise ratio of the received signals.

A return path for the modulated alternating currents transmitted in the drill string 12 is provided by connection to an electrode 62 that is buried in the earth at 64. Current flows in the strata 36 between the electrode 62 and the drill bit 14 along a current flow path as indicated at 66. Leakage current flow paths as indicated at 68 also exist whch attenuate the transmitted signals. Signal attenuation can be reduced by insulating the drill pipe 12 from the strata 36 by using an insulative drilling fluid 18 or an insulative coating on the external surface of the drill pipe. Signal attenuation can also be reduced by decreasing the transmitter frequency with a corresponding decrease in the rate of data transmission.

Details of the operation of the surface unit 42 as well as its interaction with the down-hole module 40 are described below.

In reference now to FIG. 2, the packaging and installation of the down-hole module 40 will now be described. A specially modified drill collar 13 provides a housing for the attachment of the various components of the module 40. The upper end of drill collar 13 is attached to the bottom section of the drill string 12 with a threaded connection 72. The lower end is provided with mounting threads 74 for the attachment of the drill bit 14.

To provide inductive coupling to the collar 13 for logging and communication, the three toroidal transformers 44, 46, and 48 are disposed at three, spaced-apart locations along the length of the cylindrical collar which forms an external housing for the module 40. The transceiver toroid 48 is located near the top of the collar 13, the logging toroid 46 is located directly above the drill bit 14, and the excitation toroid 44 is positioned between the transceiver and logging toroids. In each case, the toroids 44, 46, and 48 are recessed within annular grooves 43, 45 and 47 respectively, so that they encircle the collar 13. Consequently, currents flowing through the drill collar necessarily pass through the axial openings of the toroids.

Several sensors or transducers are attached to the drill collar 13 at various locations for measuring parameters such as temperatures, pressures, and forces that are of interest to the drilling rig operators. By way of example, two sensors 76 and 78 are shown disposed along the interior and exterior surfaces, respectively, of the collar 13 for monitoring the flow of drilling fluid 18. Forces such as weight and torque on the drill bit 14 are monitored by a load transducer 80. All of the sensors and transducers 76, 78, and 80 along with all of the toroidal transformers 44, 46, and 48 are electrically coupled to an electronic system 82 via a wiring harness 84. Within the system 82 are electronic circuits that process data from the logging toroid 46 and from the sensors and transducers 76, 78, and 80, and communicate with the surface unit 42.

Electrical power is supplied to the system 82 by an alternator 86 coupled to a turbine 88 that is driven by the circulating drilling fluid 18. The alternator 86 is contained within a shell 90 that is attached to the collar 13 with resilient supports 92 and 94 which tend to isolate the shell somewhat from the vibrations of the drill collar. Upstream, the shaft 96 of the turbine 88 is rotatably coupled to a turbine support 98, while downstream, the shaft of the turbine is supported by the alternator 86 and its shell 90. Power from the alternator 86 is conveyed to the system 82 through a power cable 100.

In a fashion similar to that of the alternator 86, the electronic system 82 is housed within a shell 102 that provides a protective environment for the circuitry contained within. Resilient supports 104 and 106 position the shell 102 within the collar 13. Both of the shells 90 and 102 and all of the supports 92, 94, 98, 104, and 106 are preferably streamlined in shape so as to minimize their restriction to the flow of the drilling fluid 18.

Figure 3:
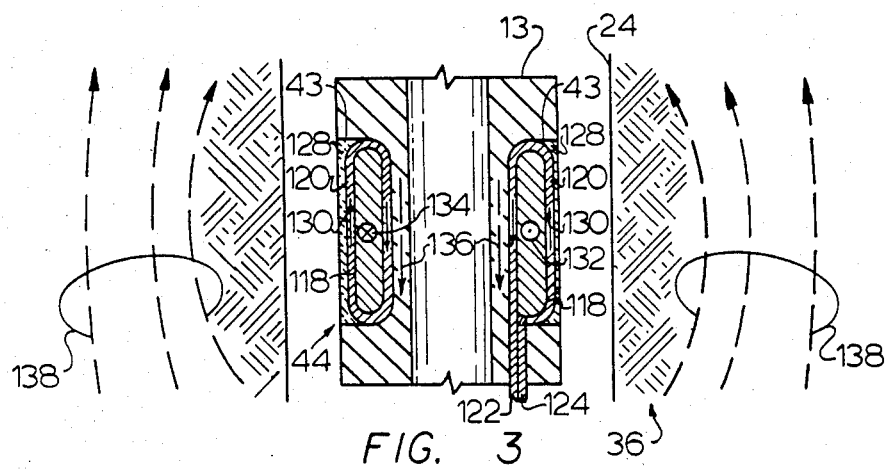
FIG. 3 is a sectional view of a toroidal transformer utilized as a transmitter in the down-hole measurement unit of FIG. 2.

FIG. 3 shows details of the configuration and operation of the excitation toroid 44. Physically, the excitation toroid 44 is composed of a toroidal shaped core 118 of a magnetic material such as iron or ferrite with a coil winding 120 of insulated wire wrapped such that each loop of wire passes from the inside to the outside of the core. Two leads 122, and 124 of the coil winding 120 are connected to the system 82 through the wiring harness 84. The toroid is installed in the annular recess 43 formed in the collar 13 and is protected by an insulative cover 128 of potting material or the like.

In operation, an alternating current is caused to flow in the coil winding 120 as depicted at an instant of time by arrows 130. This current flow developes a magnetic field which in turn induces an electrical current 136 in the drill collar 13 causing electrical currents 138 to flow in the surrounding strata 36. These are used to accomplish logging of the strata.

Figure 4:
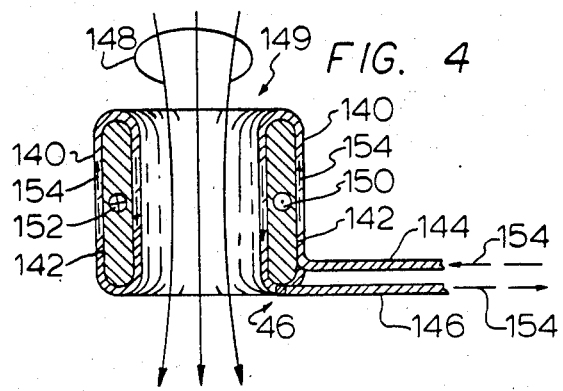
FIG. 4 is a sectional view of a toroidal transformer utilized as a receiver for data logging in the down-hole measurement unit of FIG. 2.

The logging toroid 46 is constructed and mounted in a similar fashion and is schematically shown in FIG. 4 as it might prior to it mounting on the drill collar 13. As with toroid 44, insulated wire forming a coil winding 140 is wrapped around an annular core 142 of magnetic material and the leads 144 and 146 are coupled to the wiring harness 84 for connection to the system 82. The logging toroid 46 acts as a current detector and responds to a current flow, as indicated at 148, within the axial opening 149 of the toroid by establishing a magnetic field in the core 142. The direction of such field is depicted by arrow head 150 and arrow tail 152. This magnetic field induces an electrical current flow 154 in the coil winding 140 that is proportional to the current 148 passing through the axial opening 149 of the toroid. This induced current is subsequently utilized to characterize the surrounding strata 36. All three of the downhole toroidal transformers 44, 46, and 48 may be of substantially the same configuration in both construction and installation.

Well logging is accomplished in the measurement while drilling (MWD) apparatus, according to the preferred embodiment of the present invention, by using the drill string 12 as a means to effect communication between the down-hole module 40 and the surface unit 42.

Figure 5:
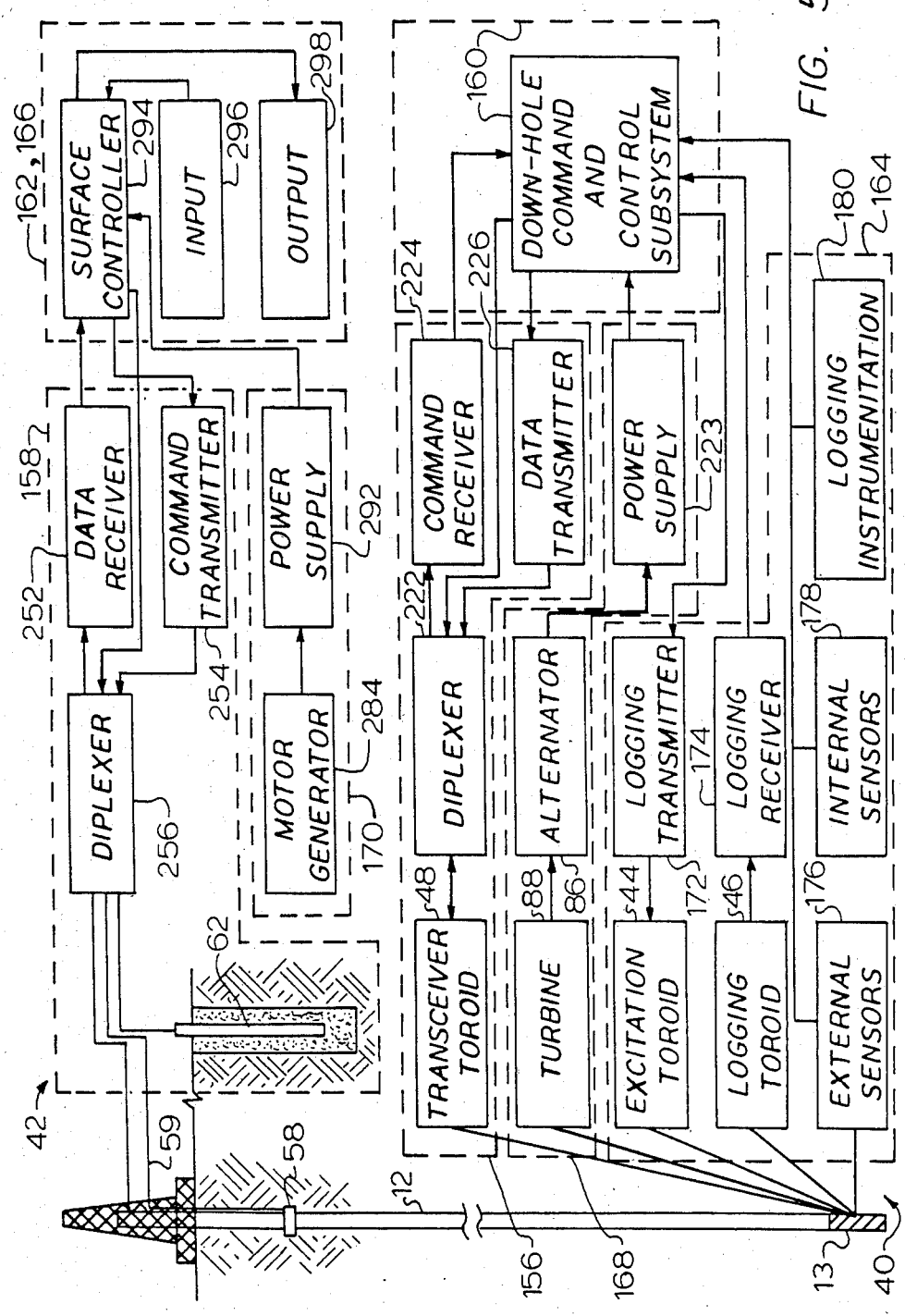
FIG. 5 is a functional diagram of the measurement while drilling system of FIG. 1 including the down-hole measurement unit of FIG. 2 and a surface recording and control unit.
Figure 6A:
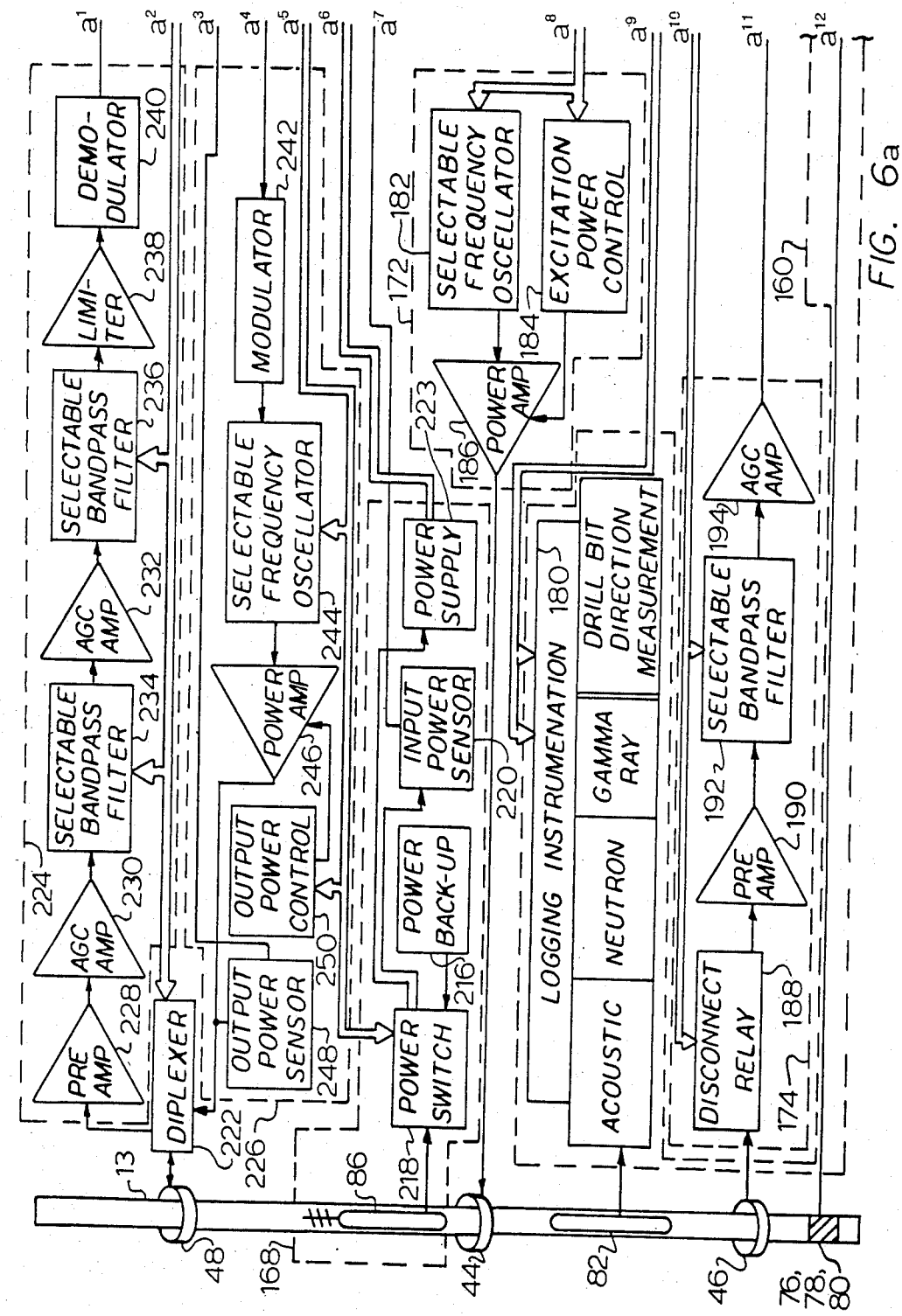
Figure 7A:
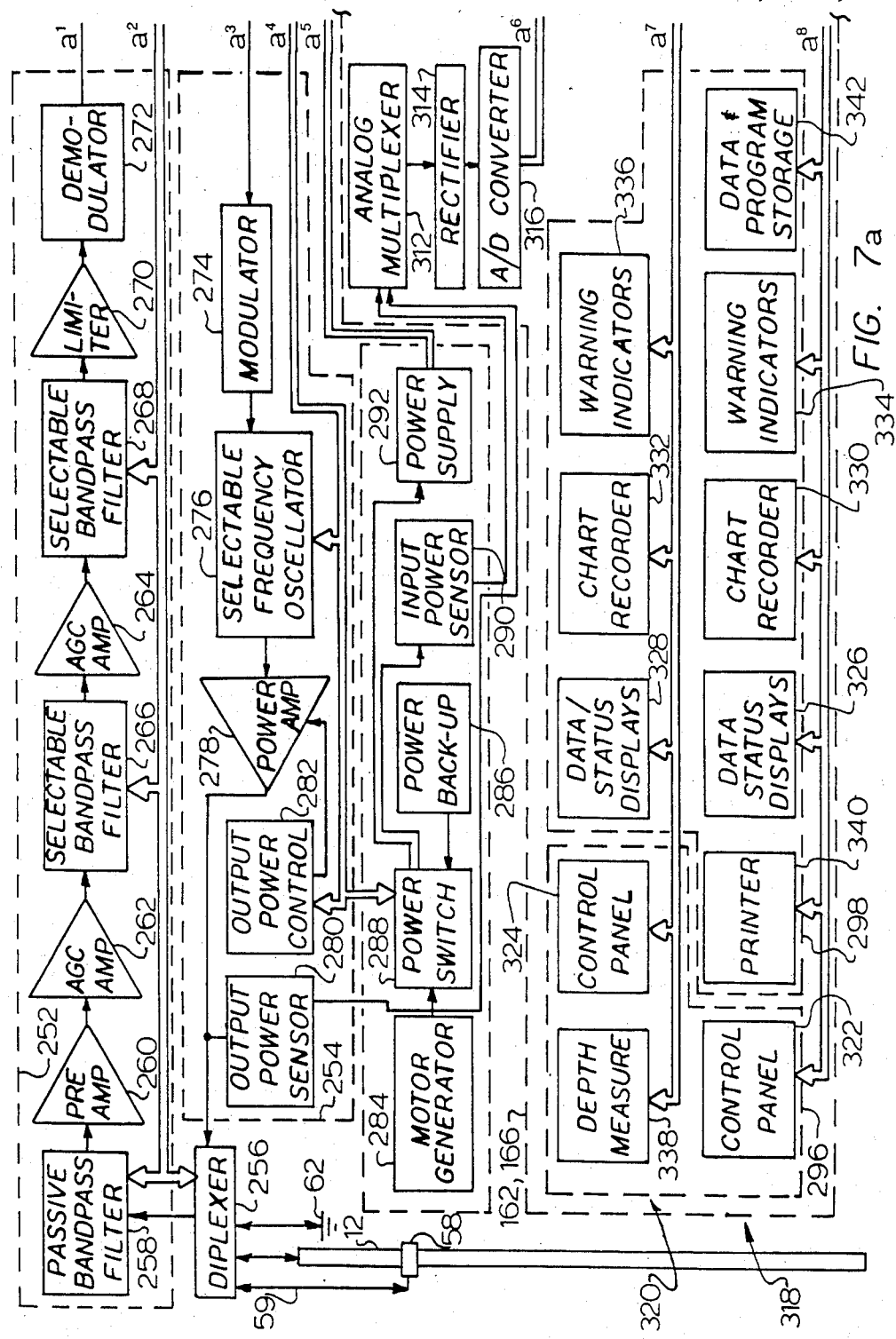

The operation of the MWD system will now be generally described with reference to FIG. 5. Also, the specific operation and configuration of the down-hole module 40 and the surface unit 42 will be described with reference to FIGS. 6 and 7, respectively.

Both the down-hole module 40 and the surface unit 42 consist of four subsystems; namely, communications subsystems 156 and 158, command and control subsystems 160 and 162, data acquisition subsystems 164 and 166, and power subsystems 168 and 170 (down-hole module and surface unit respectively). Collectively, these subsystems perform the well logging and data communication functions of the MWD apparatus. In the down-hole module 40, all of the components of the subsystems are contained within the down-hole shell 102 with the exception of the toroidal transformers 44, 46, and 48, the sensors and transducers 76, 78, and 80, the turbine 88, and the alternator 86.

The data acquisition subsystem 164 provides for the measurement of certain parameters concerning the well drilling operation. Among the parameters of interest are the following: phase shift and attenuation of currents induced in the strata 36; temperatures of the drill collar 13, drill bit 14, drilling fluid 18, and within shell 102; internal and external (annulus) pressures of the drilling fluid; weight and torque on the drill bit; drill bit wear; borehole deviation and direction; radiation log of the strata using gamma ray and neutron bombardment; and acoustic log of the strata. Some of these parameters are measured or sensed within the shell 102, such as, for example, the radiation log and drilling direction, while other parameters are measured or sensed by sensors mounted on the drill collar 13, such as, for example, the excitation and logging toroids 44 and 46, the flow sensors 76 and 78, and the strain gages 80.

The down-hole data acquisition subsystem 164 includes a logging transmitter 172 for driving the excitation toroid 44, and a logging receiver 174 for processing signals from the logging toroid 46. Also included are external and internal sensors 176 and 178, and logging instrumentation 180 for gathering other desired data.

In the logging transmitter 172, the down-hole command and control subsystem 160 selects the frequency and power of the signal that drives the excitation toroid 44. A selectable frequency oscillator 182 and an excitation power control 184 are controlled by the down-hole command and control subsystem 160 for directing a power amplifier 186 in the generation of that signal. As an example, frequencies in the range between 1000 Hz to 30 MHz may be generated by the logging transmitter 172 for driving the excitation toroid 44 through its coil winding 130. The excitation toroid 44 is thus selectively operable to induce currents in the drill collar 13 over a wide range of frequencies.

A portion of the current induced in the drill collar 13 by the excitation toroid 44 is sensed by the logging toroid 46 and is characteristic of the conductivity and dielectric constant of the strata adjacent to the drill bit 14. Signals induced in the logging toroid 46 by the current flowing in the drill collar 13 are amplified and filtered by the logging receiver 174. Signals from the logging toroid 46 sequentially pass through a disconnect relay 188, a pre-amplifier 190, a selectable bandpass filter 192, and an automatic gain controlled amplifier 194 to provide a signal which is characteristic of the adjacent strata to the down-hole command and control subsystem 160.

The remainder of the down-hole data acquisition subsystem 164, namely the external and internal sensors 176 and 178, and the logging instrumentation 180, also gathers data concerning the drilling operation. External sensors 176 are positioned on the drill collar 13, and sense weight and torque on the drill bit 14, drilling fluid temperature, and drilling fluid pressure within the drill collar 13 and within the annular space between the drill collar 13 and the well bore 24.

Figure 2:
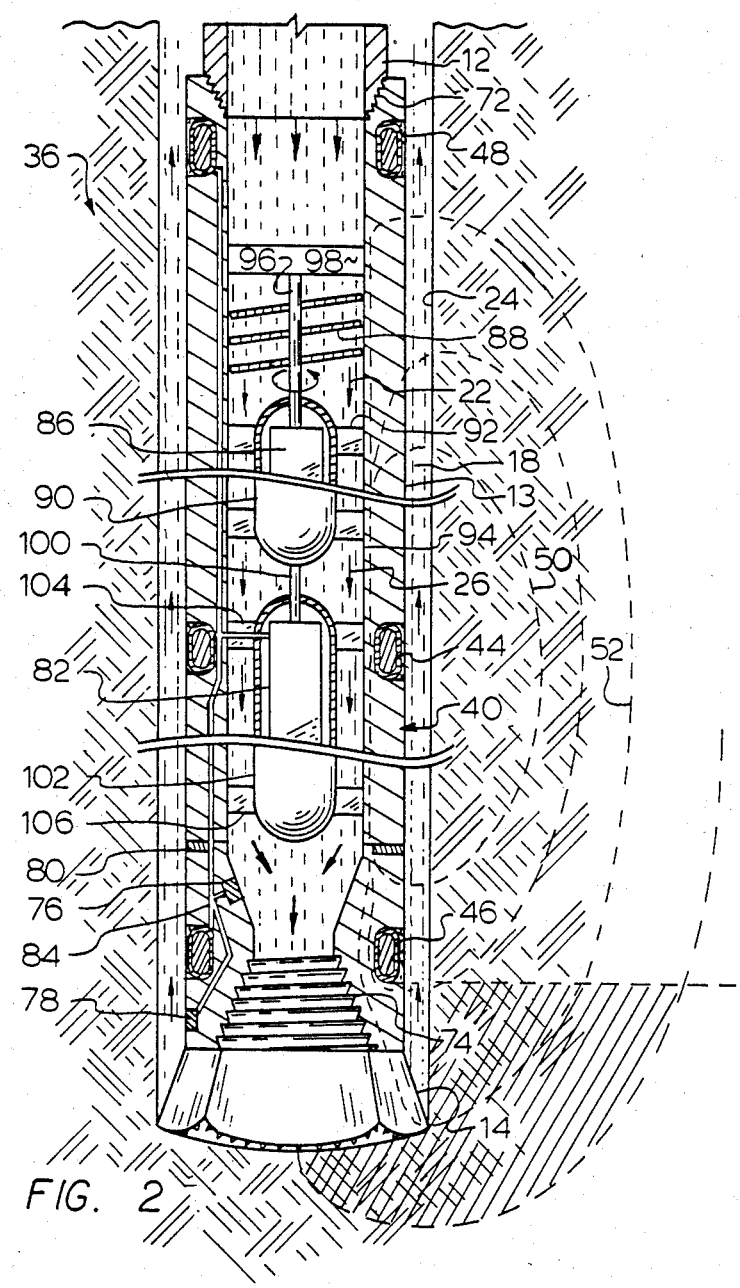
FIG. 2 is a sectional view of a down-hole measurement unit utilized for down-hole information gathering in the information while drilling system of FIG. 1.

The sensors and transducers 76, 78 and 80 shown in FIG. 2 are examples of external sensors 176. The internal sensors are contained within the protective shell 102 and sense the temperature and pressure within the shell. Also contained within the protective shell 102 is the logging instrumentation 180 that logs radiation and acoustic data concerning the strata adjacent to the drill collar 13. It also determines the direction in which the drill bit 14 is drilling. Data gathered by the external and internal sensors 176 and 178, as well as data gathered by the logging instrumentation, is input to the down-hole command and control subsystem 160 for further processing and transmission to the surface unit 42.

The heart of the down-hole measurement unit is the down-hole command and control susbystem 160. It acts to collect data from the data acquisition subsystem 164, processes and analyses the data, determines priorities for data communication either internally or upon command from the surface unit 42, controls the output of the excitation toroid 44, distributes power from the down-hole power subsystem 168 to various circuitry within the module 40, and controls communications by determining transmission frequency and power, and reception frequency.

This is accomplished by providing a microprocessor 196 with a programmable read only memory (PROM) 198, a random access memory (RAM) 200, and an electrically eraseable programmable read only memory (EEPROM) 202 interconnected in a well known manner. The computer thus formed is interfaced to the remainder of the down-hole module through an input-/output digital converter 206. Two analog multiplexers 208 and 210 are provided to selectively switch data inputs to the computer. Data from the external and internal sensors 176 and 178 are boosted by a conditioning amplifier 212, while data from the logging receiver 174 is transformed from alternating to direct current signals by a rectifier 214. Operating instructions may be stored in the PROM 198 and the EEPROM 202, or may be down-loaded from the surface unit 42 and stored in the RAM 200.

Power for the operation of the down-hole module 40 is provided by the turbine driven alternator 86, with a battery powered back-up 216. Selection between the two sources of power is accomplished by a power switch 218 that is controlled by the down-hole command and control subsystem 160 in response to an input power sensor 220. When the flow of drilling fluid 18 slows significantly, or stops, the power switch 218 switches in the back-up power unit 216 to allow the down-hole module to continue to function. Since the power generated by the alternator can vary widely in voltage and frequency, it is regulated, rectified and filtered by a power supply 222 which supplies clean power to the down-hole command and control subsystem 160 for distribution throughout the down-hole unit 40.

The down-hold module 40 and the surface unit 42 are linked together through bi-directional communications. Each unit includes a communications subsystem which permits the transmission of command signals from the surface unit 42 to the down-hole module 40, and the transmission of measurement data from the down-hole module to the surface unit. The communication signals are preferably carried waves modulated by phase-shift or frequency modulation. These communication signals are carried by the conductive drill string 12 between the down-hole module 40 and and surface unit 42. Transmission frequency is varied as a function of the signal attenuation present in the transmission line (drill pipe 12 and collar 13). Signal attenuation increases as the well deepens, so the transmission frequency is decreased to compensate. The frequency band used may, for example, be between 20 Hz and 1000 Hz.

Operationally, the down-hole communications subsystem 156 receives command signals from the surface unit 42 and transmits measurement data signals to the surface unit. Connection to the drill collar 13 is provided by inductive coupling through the transceiver toroid 48. The coil windings of the transceiver toroid 48 are connected to a diplexer 222 which functions as a switch to alternately connect the transceiver toroid to either a command receiver 224 or a data transmitter 226. Both the command receiver 224 and the data transmitter 226 are coupled to the down-hole command and control subsystem 160 for transmission frequency selection and data transfer.

Specifically, the command receiver contains a pre-amplifier 228, two automatic gain controlled amplifiers 230 and 232, two selectable bandpass filters 234 and 236, a limiter 238, and a demodulator 240. Functionally, command signals induced in the coil windings of the transceiver toroid 48 are directed by the diplexer 22 to the pre-amplifier 228 for amplification. From there, the command signals pass through the first automatic gain controlled amplifier 230 and the first selectable bandpass filter 234 for filtering in a frequency range determined by the down-hole command and control subsystem 160. Next, the command signals pass through the second automatic gain controlled amplifier 232 and the second selectable bandpass filter 236 and into the limiter 238. Finally, the command signals are demodulated by the demodulator 240 and sent to the down-hole command and control subsystem 160 for further action.

Data signals, containing the logging data obtained by the down-hole data acquisition subsystem 164, are input to the data transmitter 226 by the down-hole command and control subsystem 160 for transmission to the surface unit 42. To do so, the data signals are input to a modulator 242 for conversion to a modulated waveform which is then input to a selectable frequency oscillator 244 that sets the frequency of the carrier wave as directed by the down-hole and control subsystem 160. Continuing, the signal enters a power almplifier 246 for boosting, then passes through the diplexer 222 and to the coil windings of the transceiver toroid 48 for inductive coupling into the drill collar 13. The power level of the boosted signal is monitored by an output power sensor 248 and is controlled by an out-hole command and control subsystem 160.

Functionally, the surface communications subsystem 158 is very similar to the down-hole communications subsystem. It contains a data receiver 252 for receiving measurement data signals from the down-hole measurement unit 40 and a command transmitter 254 for transmitting command signals to the down-hole unit. A diplexer 356 alternately couples either the data receiver 252 or the command transmitter 254 to the top of the drill pipe 12 and to the electrode 62 for directly accessing the electrical currents flowing in the drill pipe. In an alternative embodiment, the diplexer connects the drill string 12 to the electrode 62 and alternately couples either the data receiver 252 or the command transmitter 254 to the fourth toroidal transformer 58 for indirectly accessing the electrical currents flowing in the drill string.

Signals entering the data receiver 252 first pass through a passive bandpass filter 258 then through an amplification and filtering circuit that is identical in form and function to that of the command receiver 224. Specifically, this circuit includes a pre-amplifier 260, two automatic gain controlled amplifiers 262 and 264, two selectable bandpass filters 266 and 268, a limiter 270 and a demodulator 272. The filters are coupled to the surface command and control subsystem 162 for frequency selection. The output of the demodulator, which contains the measurement data from the down-hole measurement unit 40, is coupled to the surface data acquisition subsystem 166 for further processing.

In a corresponding fashion, the command transmitter 254 is identical in form and function to the data transmitter 226 of the down-hole communications subsystem 156. A modulator 274, a selectable frequency oscillator 276, a power amplifier 278, an output power snsor 280, and an output power control 282, all function as do their down-hole counterparts. Accordingly, command signals from the surface command and control subsystem 162 are processed to yield a modulated signal of selected frequency and power for transmission in the drill string 12.

Electrical power for the surface unit 42 is provided by the surface power subsystem 170. A motor generator 284 provides the primary source of power while a battery source or the drilling rig motor generator provides a power back-up 286. Selection between the two sources of power is accomplished by a power switch 288 that is controlled by the surface command and control subsystem 162 in response to an input power sensor 290. Power conditioning including voltage regulation and noise filtering is necessary and is provided by a power supply 282. The conditioned power is routed within the surface unit 42 by the surface command and control subsystem 162.

Data acquisition and command and control is accomplished in the surface recording and control unit 42 by a surface controller 294 in conjunction with several input and output devices 296 and 298. The data acquisition functions consist of processing measurement data from the data receiver 252 and converting it to a format suitable for output. Concurrently, the command and control functions include generating command signals for transmission to the down-hole measurement unit 40 for controlling logging frequency and data transmission frequency and content. The command and control functions also include interfacing to the various surface subsystems for communication with the outside world and for power distribution.

These functions are provided in the surface controller 294 by a computer 300 that includes a microprocessor 302, a programmable read only memory (PROM) 304, a random access memory (RAM) 306, and an electrically eraseable programmable read only memory (EEPROM) 308, all interconnected in a manner well known in the art. Interfacing to the computer 300 and the remainder of the surface unit 42 is provided by an input-/output buffer 310. Signals from the output power sensor 280 and the input power sensor 290 are connected to the I/O buffer 310 through an analog multiplexer 312, a rectifier 314 and an analog to digital converter 316. Operating instructions for the surface controller may be stored in the PROM 304 or the EEPROM 308 or it may be input by the operator or down-loaded from a storage device.

System input and output is provided at two locations, namely a logging operator station 318 and a drill rig station 320. Control panels 322 and 324, data/status displays 326 and 328, chart recorders 330 and 332, and warning indicators 334 and 336 are located at both stations 318 and 320. Additionally, the drill rig station 320 includes a depth measure device 338 for inputting the well depth, and the logging operator station 318 includes a printer 340 and data and program storage devces 342.

As described above, the MWD apparatus measures and records well drilling data on a real-time basis.

An alternative embodiment of the present invention, shown in FIG. 8, includes a down-hole module 348 that combines the functions of the excitation and transceiver toroids 44 and 46 by employing a transceiver and excitation toroid 350 for both communications and logging excitation. In this embodiment, a data and logging transmitter 352 is operable for the generation of both data communication signals and logging signals of relatively low frequency. These signals may be, for example, in the 20 Hz to 1000 Hz range.

Since the data and logging transmitter 352 serves both communications and data acquisition functions it and all other communications and data acquisition related components may be combined into a communications and data acquisition subsystem 354. This subsystem 354 functions in a manner identical to the communications subsystem 156 and the data acquisition subsystem 164 of the previously described embodiment with one exception. The transceiver and excitation toroid 350 connects on a time-sharing basis to the command receiver 224 and the data and logging transmitter 352. Thus, the data transmission, command reception, and logging excitation functions occur sequentially, not simultaneously. The remainder of the down-hole measurement unit 348 functions as previously described.

Figure 9:
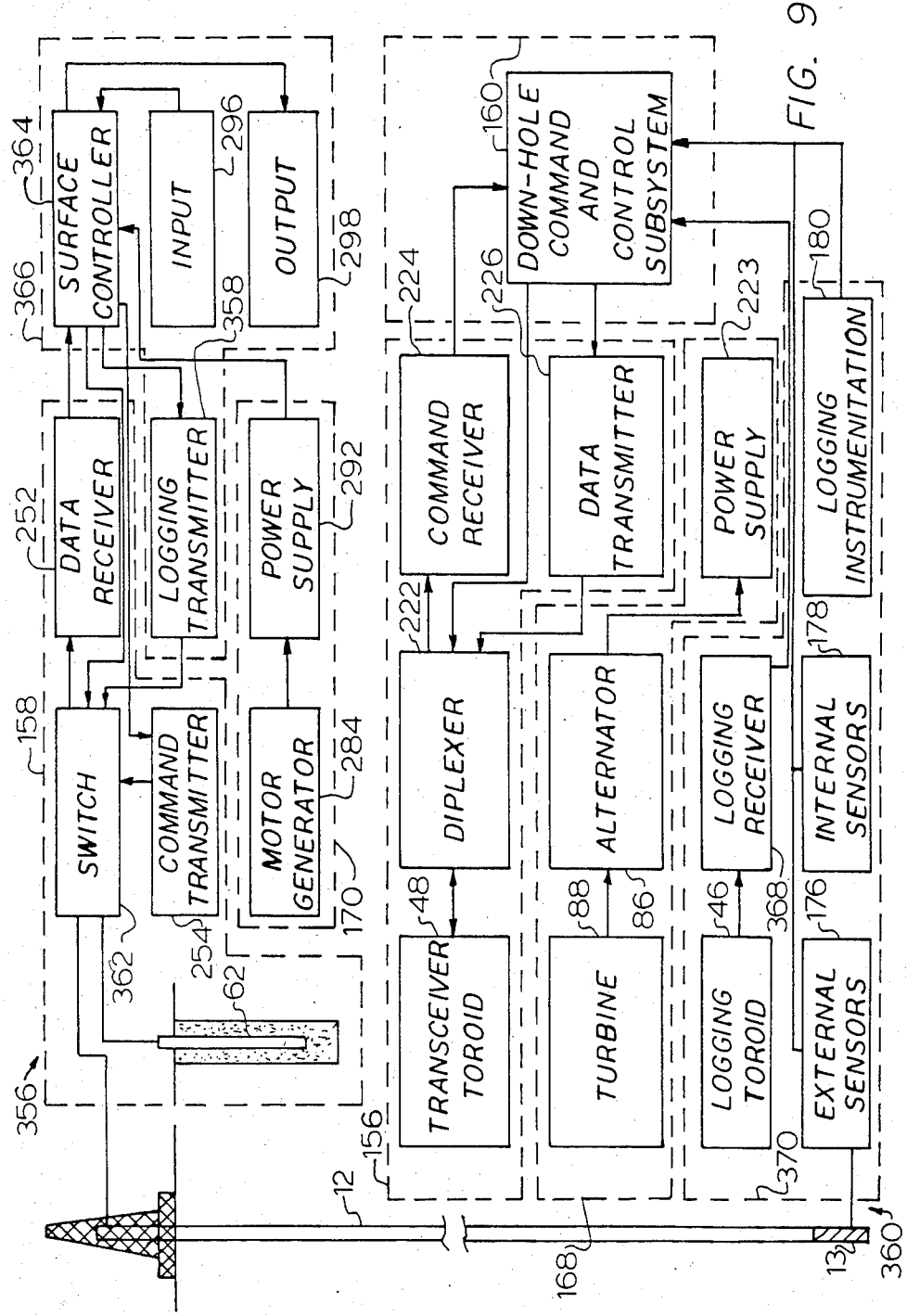
FIG. 9 is a functional diagram of an alternative embodiment of a measurement while drilling system that used excitation signals generated by a surface excitation, recording, and control unit for logging data relating to well drilling.

In another alternative embodiment of the present invention, shown in FIG. 9, a surface recording and control unit 356 contains a logging transmitter 358 for generating logging signals at the surface for transmission down-hole to a down-hole module 360. Accordingly, a switch 362 sequentially connects the data receiver 252, the command transmitter 254, and the logging transmitter 358 to the drill pipe 12 and electrode 62 for reception of data or transmission of commands or logging signals. Frequency and power of the logging signals is determined by a surface controller 364 according to stored operating instructions or operator input. The combination of the logging transmitter 358 and the surface controller 364, along with the input and output devices 296 and 298, form a surface command, control, and data acquisition subsystem 366. Apart from the addition of the logging transmitter 358, the surface command, control, and data acquisition subsystem 366 is identical to the combination of the previously described surface command and control subsystem 162 and surface data acquisition subsystem 166.

In this embodiment, logging signals transmitted down the drill pipe 12, are sensed by the logging toroid 46 as previously described. Due to the long transmission path, the logging signals are transmitted at a relatively low frequency to limit signal attenuation. Consequently, a logging receiver 368 is provided in a down-hole data acquisition subsystem 370 for amplifying and filtering the low frequency signals sensed by the logging toroid 46. Apart from the removal of the logging transmitter 172 and excitation toroid 44, the present down-hole measurement unit 360 is equivalent in form and function to the previously described down-hole measurement unit 40.

Figure 10:
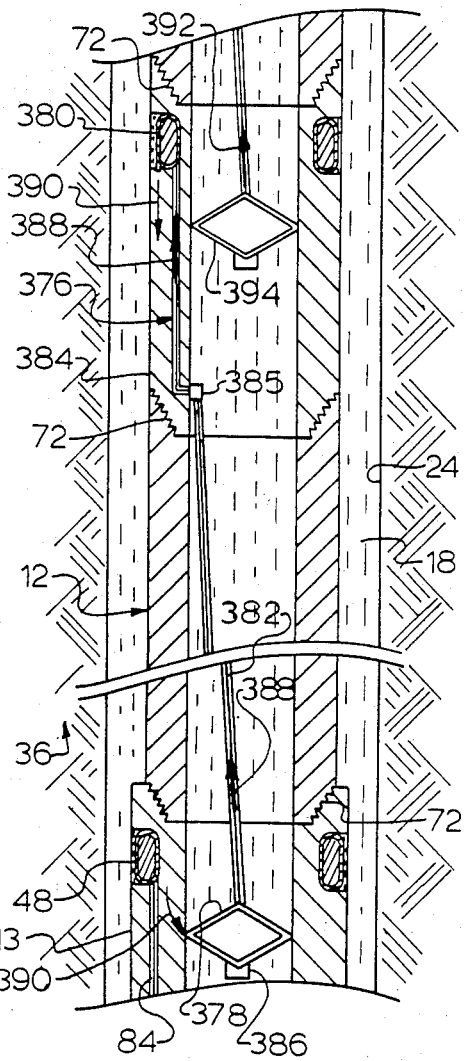
FIG. 10 is a sectional view of an alternative embodiment of a measurement while drilling system which utilizes passive couplers for reducing the attenuation of transmission signals.

Referring now to FIG. 10, an additional feature of the present invention is shown which includes passive couplers 376 used to reduce the attenuation of signals transmitted through the drill string 12. Reduction of signal attenuation is desireable in order to utilize transmission signals of high frequency for maximizing data transfer rates. By reducing signal attenuation, the passive couplers permit higher frequency transmissions of measurement data and command signals between the surface unit 42 and the down-hole module 40 than would otherwise be possible.

Each passive coupler consists of a down-hole contact 378, a coupling toroid 380, and an insulated cable 382 interconnecting the two. Mounting for the coupling toroid 380 is provided by an annular coupling body 384 which is inserted into and forms a part of the drill stirng 12 and is disposed perhaps 1000 or more feet above the down-hole module 40. Attachment of the coupling unit to the drill string 12 is provided by threaded connections 72 that are normally used for attachment of drill pipe sections. the conductor of the insulated cable 382 is attached through a connector 385 to one lead of the toroid coil windings while the other lead is grounded to the coupling body. Suspended from the unit 384 by the insulated cable 382, the down-hole contact 378 establishes electrical contact with the inside of the drill collar 13 below the transceiver toroid 48. A weight 386 is attached to the down-hole contact 378 to insure a taut insulated cable 382 and, thus a correctly positioned down-hole contact.

In operation, during data transmissions, the transceiver toroid 48 induces a current indicated by arrow 388 in the insulated (not shielded) cable 382 as well as in the drill collar 13. This current (arrow 388) travels up the insulated cable 382, and through the coil windings of the coupling toroid 380. A return path for a return current (arrow 390) is provided by the drill pipe 12 and drill collar 13 to the contact point of the down-hole contact 378. The flow of current in the coil windings of the coupling toroid 380 acts to induce a corresponding current in the coupling body 384 and the drill string 12. It may also induce current in cable 392 of another passive coupler 394. In this way, passive couplers 376 may be stacked to convey signals along the drill ipe 12 in stages. Signal attenuation is thus reduced through the use of insulated cables. This method of reducing signal attenuation is also bi-directional since the passive couplers 376 are mutually coupled.

Figure 12:
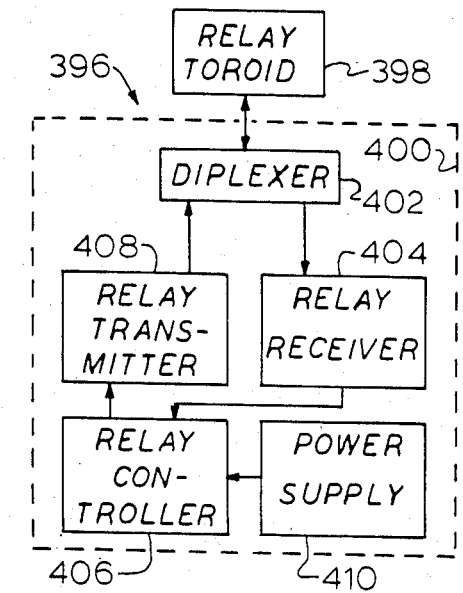
FIG. 12 is a functional diagram of an active relay utilized in the alternative embodiment of FIG. 11.
Figure 11:
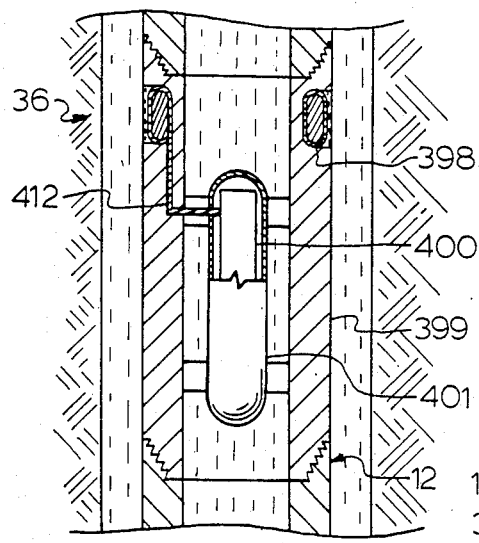
FIG. 11 is a sectional view of an alternative embodiment of a portion of a measurement while drilling system that employs active relays for improved communication between down-hole and surface units.

The utilization of passive couplers 376 is straight forward and can easily be implemented. For example, as drilling progresses, a depth will be reached where drill string signal attenuation becomes a problem. At that point, the coupling unit 384 may be attached to the top of the drill string 12 and the down-hole contact lowered into position and connected at the connector 385. Drilling then continues until another passive coupler 394 is needed. One key advantage to this method is its passive operation, ie., no additional power is required. The insulated cable can also be made up in pre-determined lengths for ease of handling Another additional feature of the present invention includes the provision of an active repeater 396 which is utilized to overcome the effects of signal attenuation (see FIGS. 11 and 12). In this embodiment, a relay toroid 398 is mounted on a coupling unit 399 in a fashion similar to the transceiver toroid 48. A relay shell 401 is suspended within the coupling sub 399 in a fashion similar to the module shell 102 described earilier. Positioned within the relay shell, a relay electronics unit 400 is provided containing a diplexer 402, a relay receiver 404, a relay controller 406, a relay transmitter 408, and a power supply 410. Electrical connection between the windings of the relay toroid 398 and the relay electronics unit 400 is provided by a cable 412.

An important advantage of insulating the drill pipe is that it allows A.C. power to be transferred downhole to power the downhole electronics so that batteries and-/or turbine alternators are not required downhole.

In addition, it also allows the downhole system to operate even when mud circulation is stopped and the drill string is being tripped out of the hole. Important pressure information can be detected (such as kicks) and transmitted to the surface which can be used to prevent a blow-out.

In operation, the relay toroid 398 inductively senses signals conveyed through the drill string 12. The relay receiver 404 is connected to the relay toroid 398 through the diplexer 402 and amplifies and filters the inductively sensed signals for input to the relay controller 406. These signals are delayed and stored by the relay controller 406 for a period of time, then output to the replay transmitter 408 for retransmission up the drill string by the relay toroid 398. Power for the relay circuitry is provided by either batteries or a turbine/alternator combination as in the down-hole module 40.

Figures 13, 14:
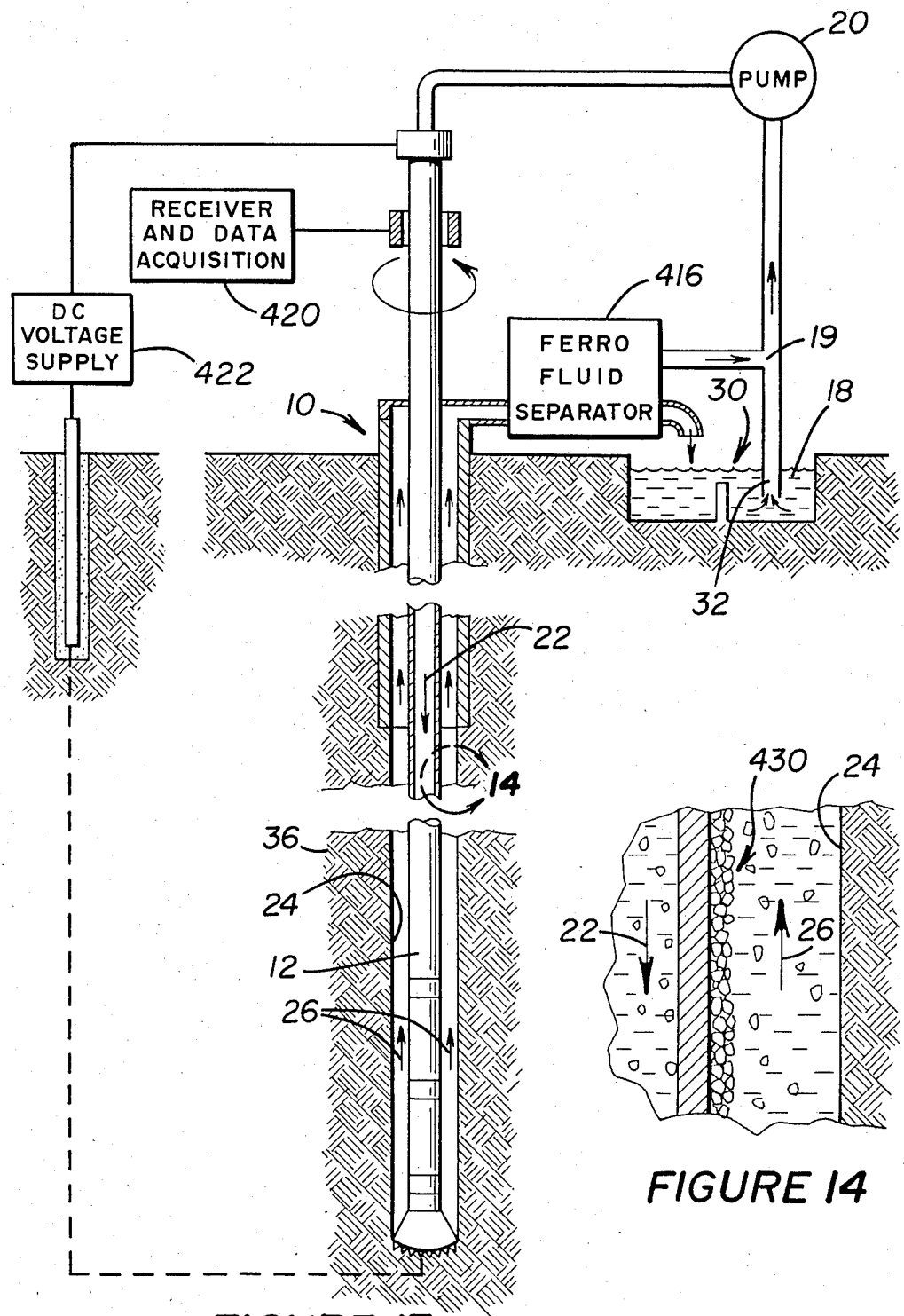
FIG. 13 is a schematic and sectional view illustrating a well drilling rig in accordance with the present invention and employing an insulative magnetic fluid as a means of providing an insulative coating to the drill string.
FIG. 14 is an exploded sectional view demonstrating operation of the insulative magnetic fluid feature shown in FIG. 13.

A futher alternative embodiment of the present invention is shown in FIGS. 13 and 14 and includes means for reducing the attenuation of signals transmitted along the drill pipe 12 by insulating the exposed surfaces thereof. Since the primary cause of signal attenuation along the drill string is shunt loss to the surrounding strata 36, any insulation that can be interposed therebetween will serve to minimize such loss. Although as mentioned above, various attempts to insulate the drill pipe have been attempted, such attempts have not been fruitful in that the elevated temperatures and severe abrasive forces experienced in the well drilling environment quickly deteriorate any coating applied to the pipe. In accordance with the present embodiment, a ferro fluid is added to the drilling fluid and a DC electrical current is applied to the drill pipe to establish a magnetic field around the drill pipe which attracts the magnetic fluid to the surface thereof.

The ferro-magnetic fluid consists of a colloidal suspension of magnetic particles in an insulative carrier fluid. The magnetic particles are normally composed of materials such as magnetite (iron oxide) and are typically smaller than 150 angstroms in diameter. Details of the composition of ferro-magnetic fluids are contained in "Designing with Ferro-magnetic Fluids", ASME Pub. No. 74-DE-5, 1974, which is expressly incorporated herein by reference. Another discussion of magnetic fluids and their use in a drilling environment may be found in the U.S. Pat. No. 2,276,075, the disclosure of which is also expressly incorporated herein by reference.

In the present invention, the magnetic particles are coated with a monomolecular layer such as an adsorbed long-chain molecule, which provides an elastic cushion between the particles and prevents unwanted flocculation (aggregation into a mass as opposed to colloidal suspension).

In a uniform magnetic field, the magnetic particles tend to rotate to align with the magnetic field. Further, in a gradiant magnetic field, the magnetic particles experience a force which tends to move them toward the region of highest magnetic flux. It being well known that a conductor with a DC current flowing therethrough has a gradiant magnetic field associated with it, it will be appreciated that the magnetic particles of the ferro-magnetic fluid will tend to move toward the conductor. Accordingly, since the coated magnetic particles are insulative in character, a direct current imposed upon the drill pipe 12 will cause the coated particles to be attracted to and magnetically adhere to the pipe 12 as illustrated in FIG. 14. A coating of liquid insulation will thus be provided on the exterior surfaces of the pipe.

An important advantage to this method of providing insulation to the drill pipe is that the insulative coating is continuously self healing. In other words, if any of the coating is scraped off by contact with the bore hole, additional magnetic particles in the ferro-magnetic fluid will immediately reattach to the pipe.

In the embodiment shown in FIGS. 13 and 14, the ferro-magnetic fluid is mixed into the drilling fluid 18 and 19 so as to form a small percentage of perhaps one percent or so thereof. The mixture is then conveyed by a pump 20 down the well 10 through the interior of the drill pipe 12 as indicated by the arrow 22. The fluid passes from pipe 12 through the drill bit 14 and then up the annular cavity formed between the drill pipe 12 and the bore hole 24 as indicated by arrows 26. Upon reaching the surface, the fluid mixture is conveyed by a pipe 414 to a separator 416 where the ferro-magnetic fluid is magnetically separated from the drilling fluid and the latter is returned to the settling pond 30. One type of separator is disclosed in the above referenced Wucnsch patent. The ferror-magnetic fluid is thereafter remixed with the drilling fluid drawn through the sum 32 and pumped down the well 10. In this fashion, the concentration of ferro-magnetic fluid in the drilling fluid can be closely controlled. This also limits the quantity of the expensive ferro-magnetic fluid required.

As in the previously described embodiments, surface recording and control apparatus 420 is provided which includes control, data acquisition, communications, and power circuitry. Also included is a D.C. biasing circuit means 422 that serves to insure that the net current flow in the drill pipe 12 is always in one direction. More specifically, it causes the alternating currents that comprised the signals transmitted by the drill pipe 12 to be offset by a bias voltage that is of sufficient magnitude to insure that the current direction is always constant.

As will be clear to those skilled in the art, modifications and changes may be made to the disclosed embodiments without departing from the inventive concepts thereof. The above description is intended as illustrative and informative but not limiting in scope. Accordingly, it is intended that the following claims be interpreted to cover all modifications that reasonably fall within the scope of the invention.

What is claimed is:

1. Measurement while drilling apparatus for detecting and communicating information relative to down-hole parameters and/or characteristics of the earth strata via an electrically conductive drill string composed of a plurality of lengths of metallic pipe connected end-to-end in series and through which a drilling fluid is caused to flow and then return to the surface through the well cavity formed between the exterior wall of the drill string and the interior wall of the well, comprising;

DC voltage supply means for establishing a unidirectional biasing current passing through the electrically conductive drill string, the drill bit and the surrounding earth strata, said biasing current causing a magnetic field to be developed about said drill string;

ferro-fluid means disposed within said drilling fluid and including a colloidal suspension of ferro-magnetic particles cotaed with a non-conductive coating, said ferror-fluid means being carried by said drilling fluid through said well cavity wherein said ferro-magnetic particles are caused by said magnetic field to migrate toward the outer surface of said drill string and to form an insulative coating thereon;

down-hole module means for detecting down-hole parameters and/or characteristics of the surrounding earth strata and for developing a communicative current flow commensurate therewith in said conductive drill string; and communication means coupled to said drill string at a point remote from said module means for receiving said communicative current flow.

2. Measurement while drilling apparatus as recited in claim 1 wherein said non-conductive coating is a mono molecular layer such as an adsorbed long-chain molecule which provides an elastic cushion between the ferro-magnetic particles and prevents unwanted floccultion.

3. Measurement while drilling apparatus as recited in claim 2 wherein said ferro-magnetic particles are colloidally suspended in an insulative carrier fluid.

4. Measurement while drilling apparatus as recited in claim 3 and further comprising separator means for separating said ferro-fluid means from said drilling fluid after it is withdrawn from said well cavity but before it has been deposited in a drilling fluid reservoir, and for reintroducing said ferro-fluid means into said drilling fluid prior to its reinsertion into said drill string.

5. Measurement while drilling apparatus as recited in claim 4 and further comprising excitation source means for establishing excitation currents which pass through the earth strata, the drill bit and the electrically conductive drill string, variaations in said excitation current caused by passage through said earth strata being detected by said down-hole module means and communicated to said communication means through said drill string.

6. Measurement while drilling apparatus as recited in claim 5 wherein said down-hole module means includes:

an elongated, electrically conductive cylindrical housing forming a drill collar means for connecting said drill bit to the lower end of said drill string, first toroidal transformer means disposed at the lower end of said module for detecting excitation currects flowing through said drill bit and for developing corresponding logging currents, first detecting means responsive to said logging currents and operative to develop corresponding first data signals, and first signal coupling means for coupling said first data signals into said drill string.

7. Measurement while drilling apparatus as recited in claim 6 wherein said first detecting means includes:

first receiver means coupled to the output of said first transformer means for processing said logging currents, first transmitting means coupled to the output of said first receiver means and operative to generate said first data signals, and wherein said module means further includes power supply means for providing electrical power to said first detecting means.

8. Measurement while drilling apparatus as recited in claim 6 wherein said first signal coupling means includes second toroidal transformer means which is disposed to encircle said housing at a position spaced from said first transformer means and serves to electromagnetically couple data signals between said first transmitting means and said drill string.

9. Measurement while drilling apparatus as recited in claim 8 wherein said module means further includes:

sensor means for monitoring at least one down-hole parameter other than current sensed by said first current detecting means and for developing corresponding second data signals for input to said first transmitting means.

10. Measurement while drilling apparatus as recited in claim 9 wherein said excitation source means also generates control signal currents which pass through said earth strata, the portion of said housing encircled by said second transformer means, and said drill string, said second transformer means developing control signals in response to the passage of said control signal currents passing therethrough, and wherein said module means further includes module control means responsive to said control signals and operative to control the transmission of said first data signals and said second data signals via said first transmitting means.

* * * * *